United States Patent Office 3,431,129
Patented Mar. 4, 1969

3,431,129
FILM-FORMING POLYMERIC ORGANIC COMPOUND STABILIZED AGAINST ULTRAVIOLET LIGHT DEGRADATION WITH A KETOPHENOXY SILANE
Roshdy M. Ismail, Spich, Germany, assignor to Dynamit Nobel AG., Troisdorf, Germany, a corporation of Germany
No Drawing. Filed Aug. 17, 1966, Ser. No. 572,880
Claims priority, application Germany, Aug. 20, 1965,
D 48,017
U.S. Cl. 106—187   5 Claims
Int. Cl. C08b 27/66, 27/42

ABSTRACT OF THE DISCLOSURE

Ultra violet stabilizer for film-forming polymers, which stabilizer is a ketophenoxy silane.

---

This invention relates to the stabilization of organic polymers. It more particularly refers to a new stabilizer for polymers.

It is known that organic materials and particularly polymers are often deleteriously effected by the action of light, heat and oxygen thereon. These deleterious effects often manifest themselves in a reduction of mechanical and electrical properties, processability and in poorer appearance. It is known to retard or possibly prevent or minimize the action of heat, light and oxygen on polymers by incorporating stabilizers into polymeric formulations. Many stabilizers have been developed for many different types of polymers. These materials are often specific for one type of polymer and/or specifically for protection against one type of degradative manifestation.

One particularly bad type of degradative effect is that of 2,000 to 4,000μ ultraviolet light. These light rays often cause discoloration of the polymer and in addition often lead to the decomposition of the polymer.

It is an object of this invention to provide a novel class of polymer stabilizers.

It is another object of this invention to provide a novel class of materials which are active stabilizers for a broad spectrum of polymers.

It is a further object of this invention to provide a novel class of materials which are active stabilizers for polymers against both heat and ultra-violet light.

Other and additional objects of this invention will become apparent from a consideration of this entire specification including the claims appended hereto.

In accord with and fulfilling these objects, this invention includes a special class of silicone stabilizers corresponding to the formula:

wherein at least two of said R-groups are mono- or polyvalent hydroxy aromatic residues having a carbonyl containing substituent ortho to said hydroxy; and wherein said other R-groups, if any, are alkyl, aryl, alkoxy, or aryloxy groups.

Compounds of the aromatic hydroxy carbonyl residue type which are included in this invention correspond to the general formula:

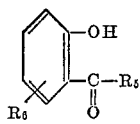

wherein $R_5$ is an alkyl, aryl, alkoxy or aryloxy group which group may have a hydroxy, halo- or cyano group substituent thereon; and $R_6$ is an alkoxy, halo, cyano or hydrogen substituent. The $R_6$ substituent may be present one or more times and, if present more than once, may be the same or different.

As used herein, the hydrocarbon portion of an alkyl- or alkoxy group is intended to include residues having up to about 6 carbon atoms as exemplified by methyl, ethyl propyl (n or i), butyl or hexyl; and the hydrocarbon position of an aryl or aryloxy group is intended to include residues having one or more aryl rings, such as phenyl, naphthyl, anthraquinyl, etc., which may or may not be alkyl (preferably up to about six carbon atoms) substituted at one or more positions or halo-substituted at one or more, preferably 3 to 5, positions. Halo atoms are exemplified by fluorine, chlorine and bromine.

As noted above, two of the R-substituents of the stabilizer of this invention may be contributed by a single compound, such as for example, 2,2'-dihydroxy benzophenone which would result in a stabilizer product of the following formula:

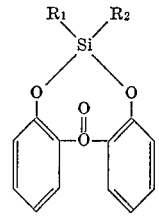

or for example a product compound of the formula:

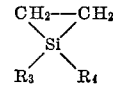

wherein $R_3$ and $R_4$ are hydroxy, carbonyl, aryl residues as set forth above.

The stabilizer compounds of this invention can be prepared by reacting the corresponding dialkyl silazenes or diaryl silazenes in equimolar quantities with the desired hydroxy aromatic compounds which have at least one carbonyl group in ortho-position. Such compounds can be prepared, for instance, in accordance with British Patent 1,082,693 and Austrian Patent 249,690. Typical representatives of the hydroxy aromatic compounds which can be used for the reaction with the silazenes are: 2 - hydroxy benzophenone, 2 - hydroxy - 4 - methoxy-benzophenone, 2,2' - dihydroxy - benzophenone, 2,2'-dihydroxy - 4 - methoxy - benzophenone, 2,2' - dihydroxy-4,4' - dimethoxy - benzophenone, orthohydroxy acetophenone, alkyl and aryl esters of salicylic acid, monomethyl ethers of resacetophenone (also known as peonol).

Typical representatives of the substances synthesized from the above hydroxy aromatic compounds are: dimethyl - di - (acetophenoxy-2-)-silane, methyl-tri-(acetophenoxy-2-)silane, dimethyl-di-(2 hydroxy benzophenone)-silane, methyl-tri-(2-hydroxy benzophenone)-silane, dimethyl-(2,2'-dihydroxy benzophenone)-silane, dimethyl - (2,2'-dihydroxy-4-methoxy benzophenone)-silane, dimethyl-(2,2'-dihydroxy-4,4'dimethoxy benzophenone)-silane, methyl phenoxy-(2,2'-dihydroxy-4,4'-dimethoxy benzophenone)-silane, methyl-tri-(2-hydroxy-4-methoxy benzophenone)-silane, n-decyl-tri-(2-hydroxy-4-methoxy benzophenone)-silane, dimethyl-di-(2-phenoxy carbonyl phenoxy - 2 - methoxy benzophenone) - silane, methyl - 2,4,6-tri-chlorphenoxy-di-(2-hydroxy benzophenone) - silane, methyl-2,4,6-tri-chlorphenoxy-di-(2,2'-dihydroxy-4-methoxy benzophenone)-silane, methyl-2,4,6-tri - chlorphenoxy - di - (2-hydroxy-4-methoxy benzophenone)-silane, and cyclohexyl-tri-(2-hydroxy-4-methoxy benzophenone)-silane.

The stabilizer compounds of this invention can be added to polymeric organic compounds to minimize or avoid damage by ultraviolet light and heat. They can be added, for instance, to the following polymeric organic compounds: ethyl cellulose, rigid and non-rigid polyvinyl chloride, polyvinylidene chloride, polytrifluorchlorethylene, polyester resins, e.g. polyethylene terephthalate, alkyd resins, polystyrene, polymethacrylates, polyphenylene oxide, cellulose acetate and triacetate, linear polyamides, e.g. Nylon 66, polyethers, e.g. polyethylene oxide, polyolefins, e.g. polypropylene, polybutadiene, polyacetals, etc.

The stabilizers can be added in known manner. They can also be dissolved in suitable solvents or plasticizers before the addition. In the case of rigid polyvinyl chloride and polystyrene, they can also be incorporated on rolls.

The stabilizers of the invention are used in quantities of 0.1–10% by weight, referred to the quanaity of polymer, and preferably in quantities of 0.5–5.0% by weight.

The new stabilizers can also be used in mixture with known agents.

This invention is illustrated by the following examples but is in no way limited thereby:

Example 1

Practically no clearly visible discoloration occurred in an "Atlas Fadeometer" after exposure for 450 hours on the part of plates of a thickness of 2 mm. of unsaturated polyester resins which contained 0.5% tetra-(2-hydroxy-4-methoxy benzophenone)-silane. A similar plate without stabilizer, on the other hand, showed a clear discoloration within only 25 hours.

Example 2

70 parts of suspension-polymer polyvinyl chloride having a K value of 70 were worked together with 28 parts of dioctylphthalate as plasticizer, 2 parts of soy bean oil, 0.2 part of paraffin oil as lubricant, and 2 parts of dimethyl-di-(phenoxy carbonyl phenoxy-2)-silane as stabilizer for 10 minutes on rolls at 160° C. into plates of a thickness of 3 mm. and then compressed at 170° C. into a plate of a thickness of 1 mm. The plate was exposed for 500 hours in a Xeno test apparatus and no change in color was noted.

Example 3

100 parts of suspension-polymer polyvinyl chloride having a K value of 68 were stabilized with 0.2 part of dimethyl - (2,2' - dihydroxy-4-methoxy-benzophenone)-silan (being produced by the reaction of 1 mol dimethyldichlor-silane with 2 mols of 2,2'-dihydroxy-4-methoxy-benzophenone) and 2.0 parts of di-n-butyl-di-(isooctyl-mercaptothioglycolate)-tin and were working on rolls into plates of a thickness of 2 mm. The plate was exposed for 1000 hours in a Xeno test apparatus and no change in color was noted, while another plate being worked under the same conditions, but stabilized with 0.2 part of 2,2'-dihydroxy-benzophenone and 2.0 parts of di-n-butyl-di-(isooctyl-mercapto-thioglycolate)-tin, showed a clear yellow color.

Example 4

70 parts of suspension-polymer polyvinyl chloride having a K value of 70 were rolled for 10 min. at 170° C. with 28 parts of diisooctylphthalate, 2 parts of an epoxydized soy bean oil and 0.2 part of paraffin oil as well as 0.3 part of dimethyl-di-(phenoxycarbonylhenoxy-2)-silane and 1.2 parts of di-n-butyl-di-(isooctylmercaptothioglycolate)-tin and taken off as a rolling felt of a thickness of 1 mm. and pressed at 170° C. into a plate of a thickness of 1 mm. A test made by the fadeometer showed that the plate after an exposure of 200 kwh. had no yellow color. A comparison with another plate made under the same conditions, but stabilized with 1.3 parts of di-n-butyl-di-(isooctyl-mercaptothioglycolate)-tin and 0.3 part of salicylic acid phenyl ester showed at an exposure of 200 kwh., tested by the fadeometer, a clear yellow color.

Example 5

30 parts of ethyl cellulose, 20 parts of dammar and 0.4 part of dimethyl-di-(2-hydroxy-4-methoxybenzophenol)-silane were solved in 140 parts of toluol. This solution was given on a glass plate. After evaporating of the toluol a colorless and insoluble film was produced which does turn not yellow in the ultra-violet light. Instead of ethyl cellulose, films can be made in the same manner from other materials, such as nitrocellulose and stabilisers according to the present invention. The resulting films show the same stabilizing effect.

Example 6

A mixture of 100 parts of linear polyethylene (density being 0.948; melting index of 0.7, measured at 190° C. and a load of 2.16 kgs.) and 0.2 part methylphenyl-di-(2-hydroxy-benzophenone)-silane were rolled at 130–140° C. by a calendar into a film and pressed at 130° C. The resulting film is impermeable for ultra-violet light in the range of about 280–380μ.

The term parts is always used in the sense of weight.

What is claimed is:

1. A film-forming polymeric organic compound stabilized against the detrimental effects of ultraviolet radiation having incorporated therein a stabilizing amount of at least one compound of the formula:

wherein at least two of said R-groups correspond to a residue derived from a compound of the formula:

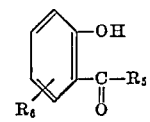

wherein $R_5$ is selected from the group consisting of lower alkyl, aryl, lower alkoxy, aryloxy, such groups having hydroxy substitution, such groups having halo substitution, and such groups having cyano substitution; and wherein $R_6$ is at least one member of the group consisting of lower alkoxy, cyano and halo groups; and wherein those R-groups of Formula I which do not conform to Formula II are at least one member selected from the group consisting of lower alkyl, lower alkylene, lower alkoxy, aryl, arylene and aryloxy.

2. The composition claimed in claim 1, wherein said stabilizer is present in proportion of about 0.1 to 10 weight percent.

3. The composition claimed in claim 1, wherein said stabilizer is present in proportion of about 0.5 to 5.0 weight percent.

4. The composition claimed in claim 1, wherein said polymer is at least one selected from the group consisting of ethyl cellulose, polyvinyl chloride, polyvinylidene halide, halogenated polyolefins, polyesters, alkyd resins, polystyrene, polyamides, polyethers, polyolefins, polyacetals, polyacrylics and copolymers thereof.

5. The composition claimed in claim 1, where said stabilizer is at least one member selected from the group consisting of: dimethyl-di(acetophenoxy-2-)-silane, methly-tri-(acetophenoxy-2-) - silane, dimethyl-di-(2-hydroxy benzophenone)-silane, methyl-tri-(2-hydroxy benzophenone)-silane, dimethyl-2,2'-dihydroxy benzophenone)-silane, dimethyl-(2,2'-dihydroxy-4 - methoxy benzophenone)-silane, dimethyl-2,2'-dihydroxy - 4,4'-dimethoxy benzophenone)-silane, methyl phenoxy-2,2'-dihydroxy-4, 4'-dimethoxy benzophenone) - silane, methyl-tri-(2-hydroxy-4-methoxy benzophenone) - silane, n-decyl-tri-(2-hydroxy-4-methoxy benzophenone)-silane, dimethyl-di-(2-phenoxy carbonyl phenoxy-2-methoxy benzophenone)-silane, methyl-2,4,6-tri-chlorphenoxy - di-(2-hydroxy benzophenone)-silane, methyl-2,4,6-tri-chlorphenoxy-di-(2,2'-dihydroxy-4-methoxy benzophenone)-silane, methyl-2,4,6-tri-chlorphenoxy - di(2-hydroxy-4-methoxy benzophenone)-silane, and cyclohexyl-tri-(2-hydroxy-4-methoxy benzophenone)-silane.

References Cited

UNITED STATES PATENTS 2,950,986  8/1960  Bailey et al. _____ 260—448.2

ALLAN LIEBERMAN, *Primary Examiner.*

U.S. Cl. X.R.

260—45.85, 45.9, 45.7